(12) United States Patent
Taylor

(10) Patent No.: US 7,017,145 B2
(45) Date of Patent: Mar. 21, 2006

(54) METHOD, SYSTEM, AND PROGRAM FOR GENERATING A USER INTERFACE

(75) Inventor: Julian S. Taylor, Nederland, CO (US)

(73) Assignee: Sun MIcrosystems, Inc., Santa Clara, CA (US)

( * ) Notice: Subject to any disclaimer, the term of this patent is extended or adjusted under 35 U.S.C. 154(b) by 731 days.

(21) Appl. No.: 09/851,832

(22) Filed: May 9, 2001

(65) Prior Publication Data

US 2004/0205715 A1 Oct. 14, 2004

(51) Int. Cl.
*G06F 9/44* (2006.01)

(52) U.S. Cl. .................. 717/104; 717/105; 717/109

(58) Field of Classification Search ............... 717/101, 717/104–110, 120, 121
See application file for complete search history.

(56) References Cited

U.S. PATENT DOCUMENTS

| | | | | |
|---|---|---|---|---|
| 6,104,874 | A | * | 8/2000 | Branson et al. ............. 717/108 |
| 6,298,474 | B1 | * | 10/2001 | Blowers et al. ............. 717/104 |
| 6,490,719 | B1 | * | 12/2002 | Thomas ...................... 717/107 |
| 6,625,804 | B1 | * | 9/2003 | Ringseth et al. ............ 717/114 |
| 6,851,104 | B1 | * | 2/2005 | Rodrigues da Silva ..... 717/104 |
| 6,865,429 | B1 | * | 3/2005 | Schneider et al. ........... 700/86 |
| 6,889,379 | B1 | * | 5/2005 | Lindhorst et al. ........... 719/316 |
| 6,934,931 | B1 | * | 8/2005 | Plumer et al. ............... 717/104 |

OTHER PUBLICATIONS

Carr, "Specifiation of interface interaction objects", ACMCHI, pp 372-378, 1994.*
Bergh et al, Towards modeing context sensitive interactive applications the context sensitive user interface profile (CUP), ACM pp 87-94, 2005.*
Mulhem et al, "Interactive information retrieval systems: From user centered interface design to software design" ACM SIGIR, pp 326-334, 1996.*
Vanderdpnckt et al, "Model based design, generation and evalutaion of virtual user interface", ACM pp 51-60, 2004.*
Mahemoff, Michael J. et al. "Handling Multiple Domain Objects with Model-View-Controller", date unavailable, pp. 1-12.
Shan, Yen-Ping, "An Event-Driven Model-View-Controller Framework for Smalltalk", an OOPSLA '89 Proceedings, 1989 ACM 089791/-333-7/89/0010/0347, pp. 347-352.
Krasner, Glenn E. et al. "A Description of the Model-View-Controller User Interface Paradigm in the Smalltalk-80 system" ParcPlace Systems, Inc., 1988, pp. 1-34.
Atlas. "3 The Model-View-Controller Architecture" [online], Aug. 30, 1996, pp. 1-3. [Retrieved on Apr. 20, 2001]. Retrieved from the Internet at URL: <http://rd13doc.cern.ch/Atlas/Notes/004/Note004-7.hrml>.
Sun Microsystems, Inc. "Model View Controller" [online], date unavailable, pp. 1-2. [Retrieved on Apr. 20, 2001]. Retrieved from the Internet at URL: <http://java.sun.com>.

(Continued)

Primary Examiner—Anil Khatri
(74) Attorney, Agent, or Firm—Lahive & Cockfield, LLP

(57) ABSTRACT

Provided is a method, system, program, and data structures for generating a user interface. An application program processes data and generates application output and a user interface module processes the application output to generate output data to render on an output device. The user interface module generates output data to render on the output device in response to processing statements in the user interface module. The user interface module reaches a processing point where the user interface module does not include statements to generate output data. After reaching the processing point, the user interface module receives an interaction object from the application program specifying data to generate as output data. The user interface module then generates output data to render on the output device from the interaction object.

54 Claims, 10 Drawing Sheets

OTHER PUBLICATIONS

Sun Microsystems, Inc. "Model View Controller (MVC)" online, from J2EE Blueprints: Design Patterns, 2001, pp. 1-6. [Retrieved on Apr. 22, 2001]. Retrieved from the Internet at URL: <http://java.sun.com>.

Baldwin, Richard G. "Implementing The Model-View-Controller Paradigm using Observer and Observable" online, 1999, pp. 1-16. [Retrieved on Apr. 20, 2001]. Retrieved from the Internet at URL: <http://home.att.net/~baldwin.rick/Advanced/Java200.html>.

Sasine, Jodene M. et al. "Implementing The Model-View-Controller Paradigm in ADA 95", date unknown, pp. 1-9.

Burbeck, Steve. "Applications Programming in Smalltalk-80 *How to use Model-View-Controller (MVC)*," online, Mar. 4, 1997, pp. 1-10. [Retrieved on Apr. 2, 2001] Retrieved from the Internet at URL: <http://st.www.cs.uiuc.edu/users/smarch/st-docs/mvc.html>.

* cited by examiner

METHOD, SYSTEM, AND PROGRAM FOR GENERATING A USER INTERFACE

BACKGROUND OF THE INVENTION

1. Field of the Invention

The present invention relates to a method, system, program, and data structures for generating a user interface.

2. Description of the Related Art

One challenge for programmers is implementing a user interface that interacts with a program to provide data to the program. One solution is to integrate the user interface within the application program itself. The problem with such an approach is that the application program has to be modified in order to extend the user interface to alternative computing platforms or extend the application program to use different types of user interfaces. To address this problem, many programmers utilize the Model View Controller (MVC) architecture to design a user interface. FIG. 1 illustrates the three components of the Model View Controller, a Model 2 which provides the core functionality or the application program code that processes input and generates output, a View 4 which comprises the specific user interface or program that renders and presents data to the user, which may comprise a command line interface, windows-style interface, browser, etc., and a Controller 6 that is a program that controls how the view presents data and receives user input. The View 4 maintains consistency in presentation across Models 2 and forwards any user input or actions to the Controller 6. In a graphical user interface (GUI), the user input to the View 2 may comprise textual data, menu clicks, selection of buttons, etc.

In the MVC architecture, the Controller 6 is programmed to cause the View 4 to present certain information to the user and receive user entered input, which the Controller 6 then returns to the Model 2 for processing therein. The Controller 6 may maintain a series of rules specify an order and format for providing questions to the View 4 to present to the user to gather information for the Model 2. The Controller 6 selects the View 4 to use to present the data based on user input and Model 2 action outcome(s). In this way, the Controller 6 establishes communication between the View 4 and the Model 2. The View 4 and Controller 6 combined comprise the user interface. The Model 2 may further notify the View 4 of any updates or changes in data to render for the user.

One advantage of the Model View Controller (MVC) architecture is that the Model 2 has absolutely no dependence on the external representation of information. This permits reusability by allowing programmers to independently change input sources and output formats without affecting the Model 2. In other words, the Model 2 deals with pure information that has no attached external meaning. The Model 2 has no responsibility for translating the format of input data or determining how output data is displayed; this is the role of the Controller 4 and View 6 components. With this architecture, the Model 2 can be used with different View 4 and Controller 6 components. Further, all Views 4 to be displayed are known beforehand and selected by the Controller 6.

One drawback with the Model View Controller (MVC) architecture is the lack of any capability for the Model 2 to request specific input from the user depending on application processing outcomes. For instance, if the input from the user needed by the Model 2 varies depending on the outcome of certain internal processing operations or the information the Model 2 needs cannot be known in advance, then the Controller 4 cannot be programmed to know in advance the presentations to make and data to gather because the presentation to make and data to gather may vary at certain processing points.

One solution would be to build capabilities into the Model 2 to directly interact with a particular View 4 to query the user. However, such an approach is disadvantageous because the Model 2 is no longer separated from the user interface and is now integrated with a particular user interface or View 4 component. Such a solution does not allow easy extension of the Model 2 to other Views 4 because the Model 2 must be supplemented with code to directly utilize alternative Views 4. Further, such a solution contradicts one of the principles of operation of the Model View Controller, which is to maintain the Model 2 entirely separate from the View 4 and Controller components managing the user interface.

For these reasons, there is a need in the art to provide improved techniques for a Model 2 to request information from a View 4 in a manner that maintains the Model 2 separate from the Controller 6 and View 4 user interface components.

SUMMARY OF THE DESCRIBED IMPLEMENTATIONS

Provided is a method, system, program, and data structures for generating a user interface. An application program processes data and generates application output and a user interface module processes the application output to generate output data to render on an output device. The user interface module generates output data to render on the output device in response to processing statements in the user interface module. The user interface module reaches a processing point where the user interface module does not include statements to generate output data. After reaching the processing point, the user interface module receives an interaction object from the application program specifying data to generate as output data. The user interface module then generates output data to render on the output device from the interaction object.

Additionally, the interaction object may include attribute information indicating characteristics of the data to output, wherein the output data is rendered in a format corresponding to the characteristics indicated in the attribute information.

The user interface module may comprise a Controller and View and the application program comprises a Model conforming to the Model View Controller architecture.

Still further, multiple user interface modules may be capable of generating output data from the interaction object, wherein each user interface module generates the output data to render in a different format. Moreover, each user interface module may generate the output data to render on a different type of output device.

Further provided is a method, system, and program for generating a user interface. An application program processes data and generates application output. A user interface module processes the application output to generate output data to render on an output device by processing statements in the user interface module. The user interface module further receives an interaction object from the application program specifying data to generate as output data and generates output data to render on the output device from the interaction object. The user interface module further receives user input in response to the output data rendered on the output device from the interaction object and adds the received user input into the interaction object. The interaction object including the received user input is returned to the application program.

In further implementations, the interaction object comprises a plurality of interactions, wherein each interaction includes data to cause the user interface module to render a message or question on the output device.

Moreover, each interaction is capable of providing information to cause the user interface module to generate a question that is a member of a set of questions comprising a true false question, an essay question, and a multiple choice question.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
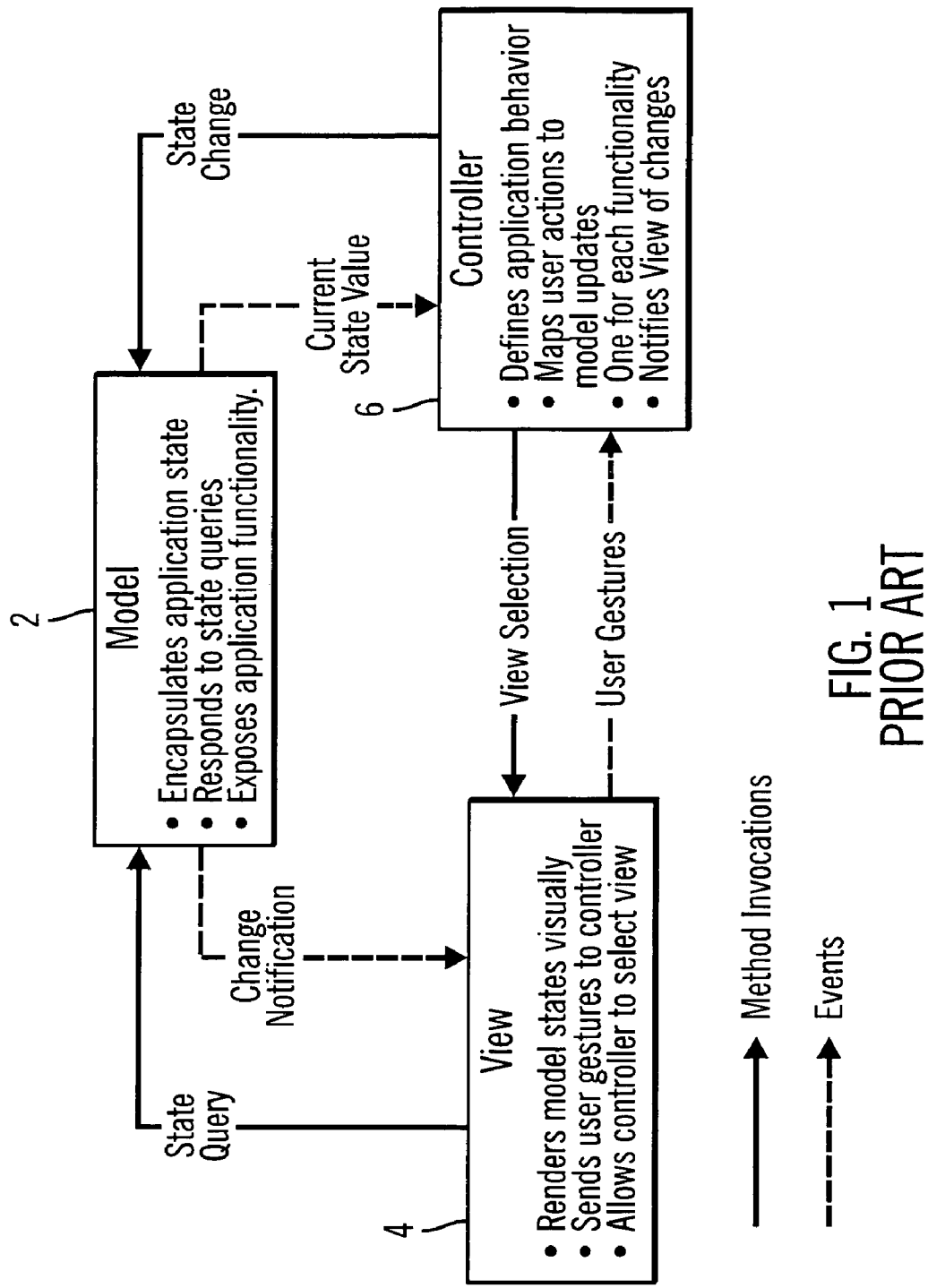
FIG. 1 illustrates a representation of the prior art Model View Controller architecture.
Figure 2:
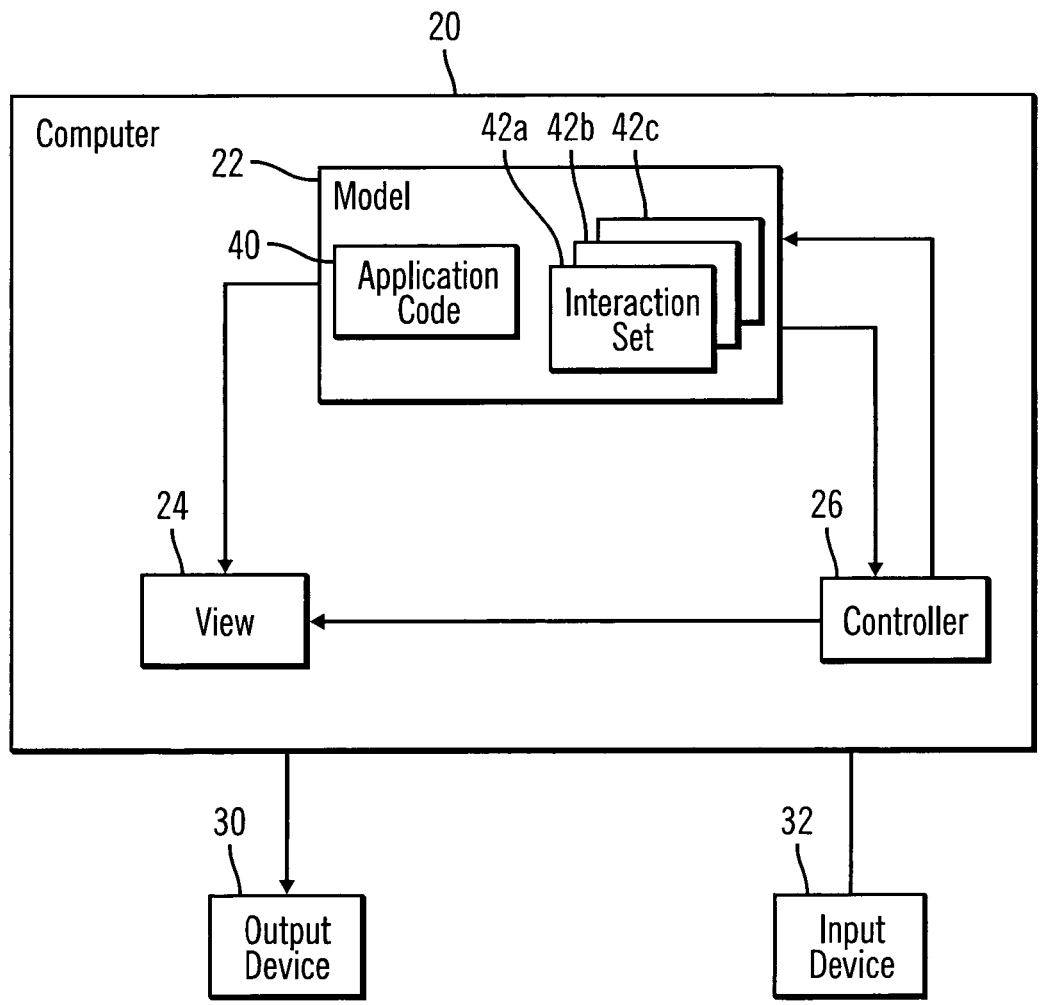
FIG. 2 illustrates a computing environment in which aspects of the invention are implemented.

FIG. 2 illustrates a computing environment including implementations of the invention. A computer 20 includes Model 22, View 24, and Controller 26 components that include the functionality of Model View Controller (MVC) components known in the art, as well as additional functionality described herein. The computer 20 may comprise any computing system known in the art, such as a desktop computer, personal computer, workstation, mainframe, server, hand held computer, palm top computer, telephony device, etc. The View 24 is capable of generating output data that may be rendered by an output device 30 to present to a user. The output device 30 may comprise a display monitor, audio speakers, printer or any other presentation system known in the art. The Controller 26 is capable of receiving user input entered through the input device 32, which may comprise a keyboard, mouse, pen stylus, microphone, touch sensitive display screen or any other input device known in the art. The Controller 26 would return user data from the input device 32 to the Model 22 for further processing and interpretation in a manner known in the art.

The Model 22 includes application code 40, which comprises the program code that performs the application processing implemented by the Model 22. In the described implementations, the Model 22 includes one or more interaction sets 42a, b . . . n that are comprised of one or more interaction objects and capable of allowing the Model 22 to control the View 24 to present on the output device 30 a query to a user for certain information that the user may enter through the input device 32. Each interaction set 42a, b . . . n is comprised of one or more interactions, where each interaction provides information regarding a generic user interaction. The controller receives this generic interaction and passes it to the View 24 to generate output data to render on the output device 30 in order to present information and, in certain instances, query the user and gather user input to return to the Model 22.

Figure 3A:
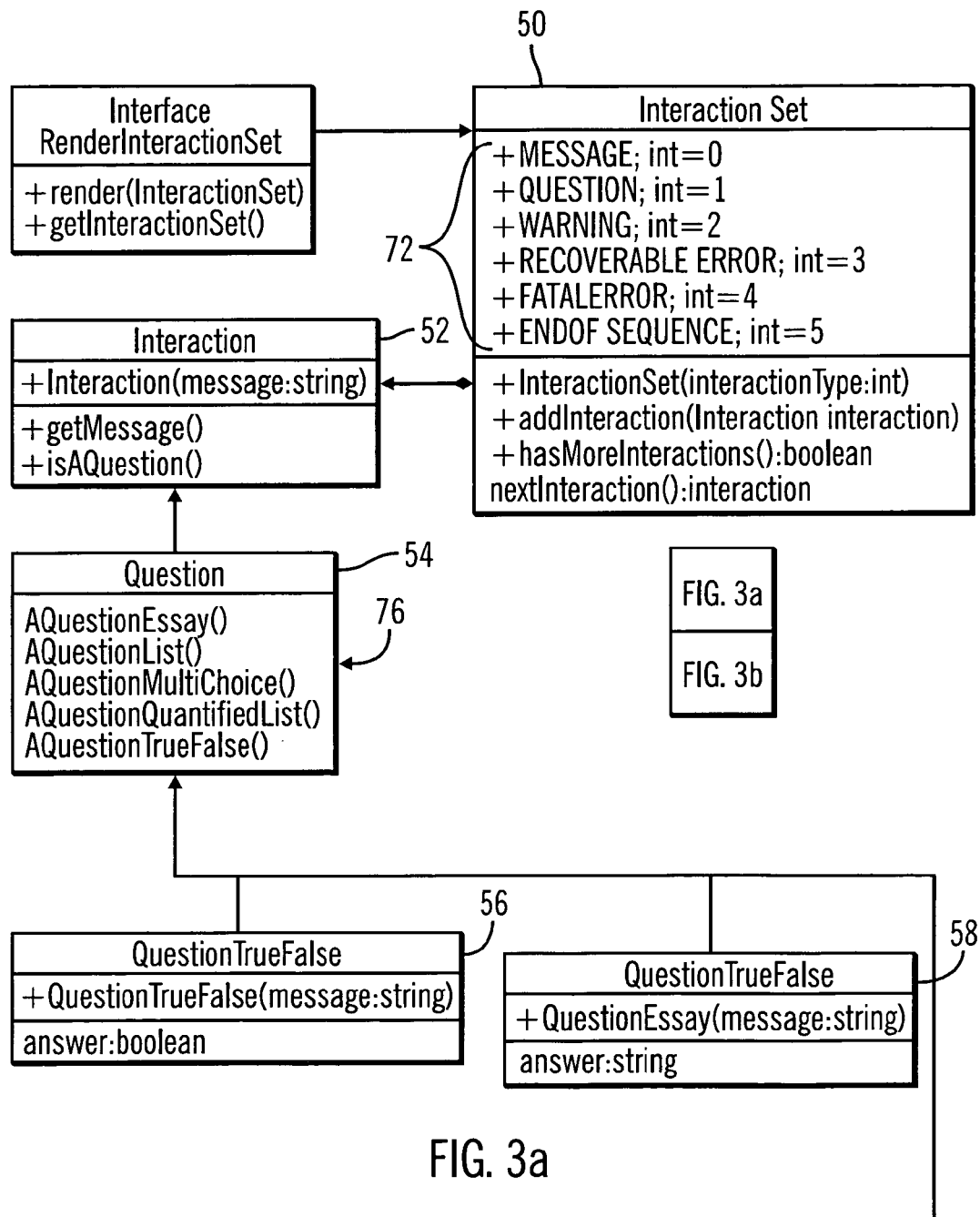
FIGS. 3a and 3b illustrate a Universal Modeling Language (UML) representation of an interaction set class, an interaction class and subclasses in accordance with implementations of the invention.
Figure 3B:
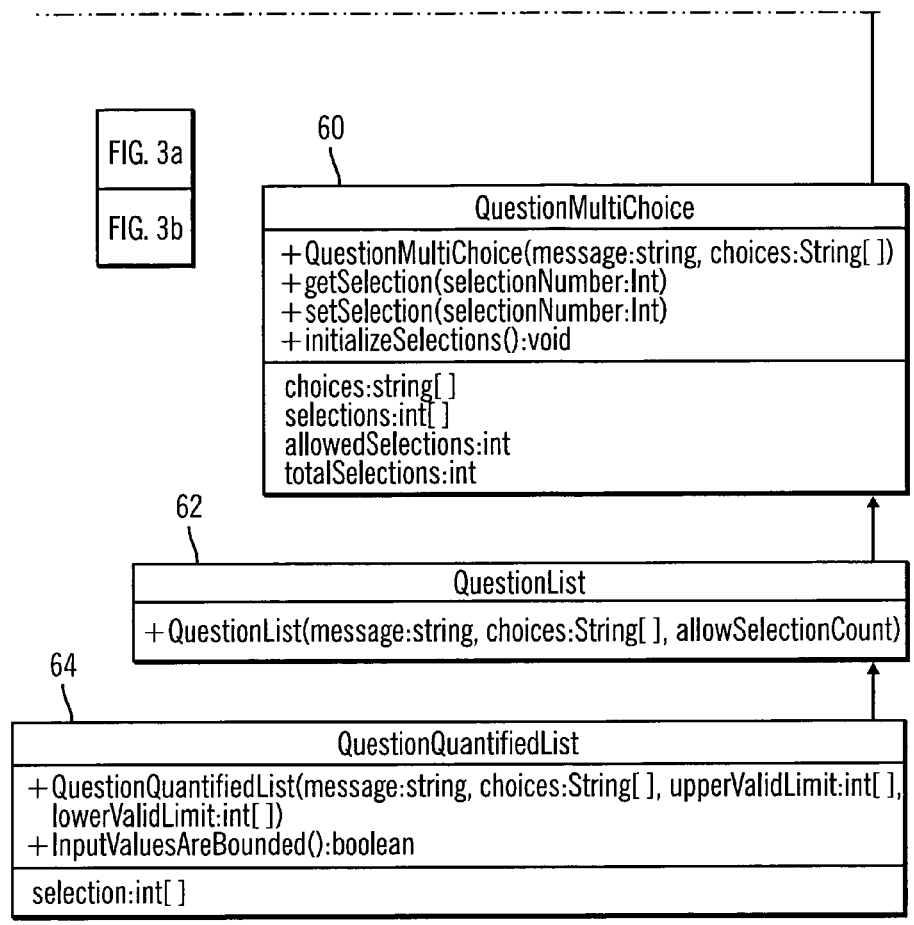

FIGS. 3a and 3b illustrate the interaction class hierarchy used to implement the interaction sets 42a, b . . . n that allow the Model 22 to specify direct controls over the View 24. A base interaction set class 50 is comprised of the following methods and variables:

Interaction Attributes: provides a description on the characteristics or nature of the data to be displayed. The View 24 may use such information to determine how to present the data. Interaction attributes may include: MESSAGE:int=0 indicates that the data comprises a message; QUESTION:int=1 indicates that the data is a question; WARNING:int=2 indicates that the data is a warning. For instance, if the interaction attribute is a warning, then the View 24 may present the data in a colored or flashing window to highlight the problem. In this way, the View 24 has a built in response to interaction attributes set by the Model 22, even though the Model 22 has no knowledge of how the View 24 will present the data. In certain implementations, the View 24 would display all the interactions in a same window in a format the View associated with the interaction attribute set by the Model 22. Alternatively, the View 24 may ignore the specified interaction attribute.

InteractionSet( ): Is a constructor that a programmer uses to create an empty interaction set 42a, b . . . n.

addInteraction(Interaction): a method used to add an interaction to an interaction set as the last message or question in the set to be displayed.

hasMoreInteractions( ):boolean: method that determines whether there are further interactions in the interaction set 42a, b . . . n to process; true means more interactions, false means no more interactions to consider.

nextInteraction( ):interaction: method that requests the next interaction in the interaction set not yet returned for processing during the current consideration of the interaction set 42a, b . . .n.

The interactions within an interaction set 42a, b . . . n are created with the following subclasses of the interaction base class50: Interaction 52, Question 54, QuestionTrueFalse 56, QuestionEssay 58, QuestionMultiChoice 60, QuestionList 62, and QuestionQuantifiedList 64. The Interaction class 52 includes the following base variables to include in an interaction added to an interaction set and methods:

Interaction(message:String): constructor used to create an interaction including a message parameter which is a string to display to the user, and may comprise a message or question.

AQuestion:boolean: provides information indicating whether the interaction provides a question to display to the user; true means that there is a question associated with the interaction and false means that the interaction is comprised solely of a message.

getMessage(string): a method that returns the message string for the interaction.

The Question subclass 54 is an abstract class that provides variables subclasses to extend the Interaction class 52 to provide questions to include in the interaction.

Type of question: A series of boolean variables that indicate the type of question, including AQuestionTrueFalse, AQuestionEssay, AQuestionMultieChoice, AQuestionList, AQuestionQuantifiedList, etc.

The QuestionTrueFalse subclass 56 extends the abstract Question class 54 to include a true/false type question in the interaction, and includes the following methods and variables:

QuestionTrueFalse(string message): a constructor that creates a true/false interaction, where the string message is the question displayed to the user.

Answer:boolean: variable set to true or false answer provided by the user in response to the string message question.

The QuestionEssay subclass 58 extends the Question class 54 to include an essay question in the interaction, and includes the following methods and variables:

QuestionEssay(string message): a constructor that creates an essay interaction, where the string message is the question displayed to the user.

Answer:string: variable set to string answer provided by the user in response to the string message question.

The QuestionMultiChoice subclass 60 extends the Question class 54 to implement a multiple choice question in the interaction, and includes the following methods and variables:

QuestionMultiChoice(message:String, choices:String [ ]): a constructor that creates a multiple choice question interaction, where the message parameter comprises the question displayed to the user and the choices parameter comprises an array, where each element in the array comprises one of the possible multiple choice answers to the question indicated in the message string.

allowedSelections:int: an integer indicating the number of multiple choice answers the user may select in the choice string array.

selections [ ]: an array of integer elements, where each element in the selections array corresponds to one of the choices in the choice array, and wherein a value of one in one selection element indicates that the user selected the corresponding choice in the choice array, e.g., a value of one in the third element of the selections array indicates that the user selected the third answer choice in the choice array.

TotalSelections:int: variable indicating how many choices user selected.

The QuestionList subclass 62 extends the QuestionMultiChoice class 60 to implement a multiple choice question list comprising a question and a set of choices. If the View 24 implements a windows interface, then the View 24 may be coded to render the choices as accompanied by user selectable check boxes or, if the View 24 implements a command line interface, then the choices may be displayed as a list with numbers, where the user would enter the number on another line for the selected choice. The allowedSelections variable may be used to limit the number of answer choices that may be selected in response to the question. The QuestionList subclass 62 includes the following methods and variables:

QuestionList(message:String, choices:string[ ]: a constructor that creates a multiple choice question including the answer string choices specified in the choices array. The methods in the QuestiorAMultiChoice subclass 60 provides further variables and methods to implement the multiple choice question list.

The QuestionQuantifiedList subclass 64 (FIG. 3*b*) extends the QuestionMultiChoice class 60 to allow for answers that comprise user entered integer values that may be specified to fall within upper and lower limits. The QuestionQuantifiedList subclass 64 includes the following methods and variables:

QuestionQuantifiedList(message:String, choices:string[ ].upperValidLImit:int[ ],lower ValidLimit:int[ ]: a constructor that creates a multiple choice question of a quantified list. The message string is the question proposed to the user, and the choice array comprises the answer choices. The upperValidLimit and lowerValidLimit comprise integer arrays indicating an upper and lower integer range that is acceptable for the user entered integer value for one choice answer, wherein the array provides acceptable ranges for each choice.

A programmer would use the constructors to create and add interactions to interaction sets in the Model 22 that are returned to the View 24 when the Controller 26 reaches a point where it needs data from the Model 22 to provide to the View 24. Different interaction sets 42*a, b . . . n* may be supplied at different outcomes in the model 22.

Figure 4:
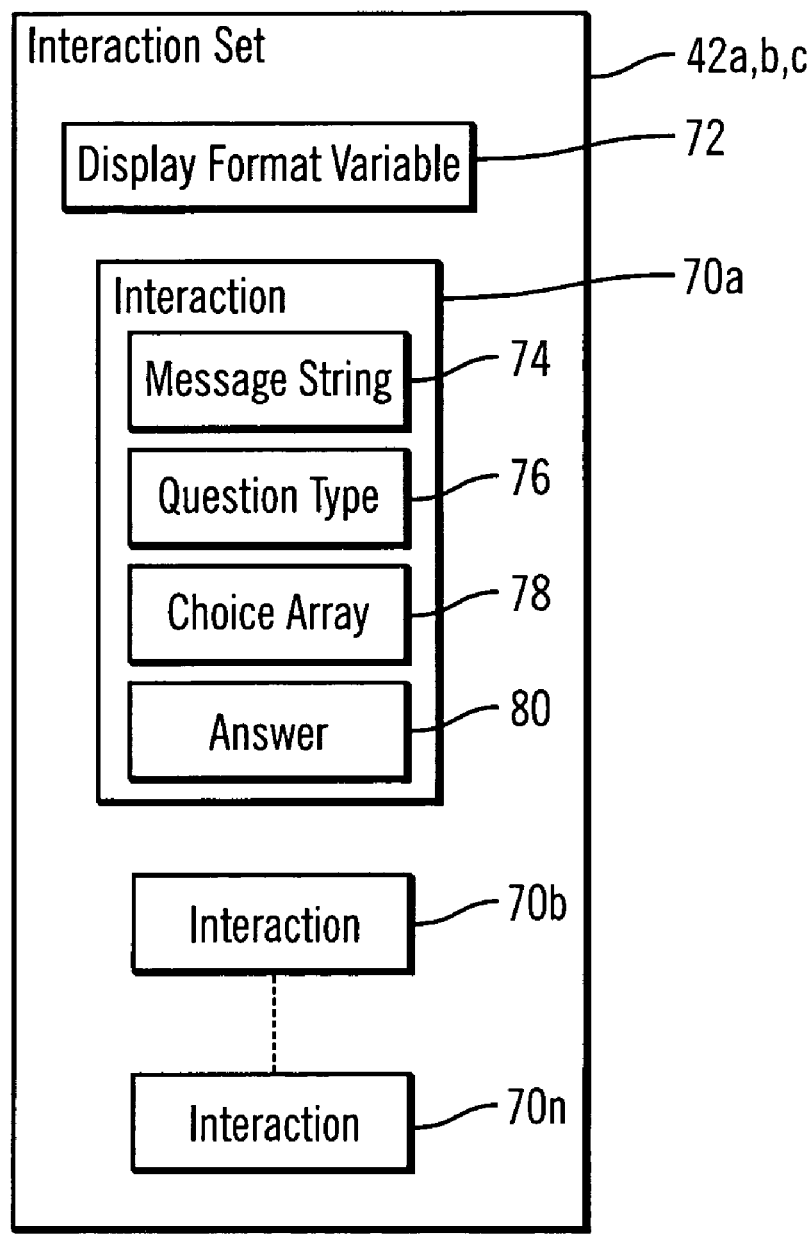
FIG. 4 illustrates components of an interaction set in accordance with implementations of the invention.

FIG. 4 illustrates details of an interaction set 42*a, b . . . n*. The interaction set 42*a, b . . . n* includes one or more interactions 70*a, b . . . n*. The interaction set 42*a, b . . . n* further includes the interaction attribute variables 72 (FIGS. 3*a* and 6), which comprise the integer variables of the interaction set base class 50 that provide information characterizing the data that may instruct the View 24 on how to display the dialog box or window including the one or more messages and/or questions in the interactions, e.g., as a message, question, warning, recoverable error, fatal error, etc. The message string 74 is the message comprising the question posed to the user. The question type comprises the series of boolean question variables 76 that indicate whether the interaction provides a question and, if so, the type of question to be rendered, e.g., true/false, essay, multiple choice, etc. For multiple choice type questions, the interaction 70*a, b . . . n* would include a choice array 78 providing the user selectable choices. Other variables may also be provided, such as the allowedSelections variable indicating the number of choices the user may select for the answer. The answer 80 comprises the user answer to the question, which may comprise a boolean value, a string, or an array of selected choices or entered integer values, depending on the type of question. If the interaction 70*a, b . . . n* provides only a message to display, then the question type 76 would indicate that the interaction 70*a, b . . . n*, is not a question and would not include data for the choice array 78, answer array 80, and other question related variables. For instance, if the interface attribute72 indicates that the message concerns a recoverable error, then a windows View 24 may display the GUI panel with a yellow background, whereas a command line interface View 24 may display the message by blinking the characters a few times. If the interface attribute indicates a fatal error, then a windows View 24 may display the message with a red background and a command line interface View 24 may display the message as continuously flashing to draw user attention to the message.

Figure 5:
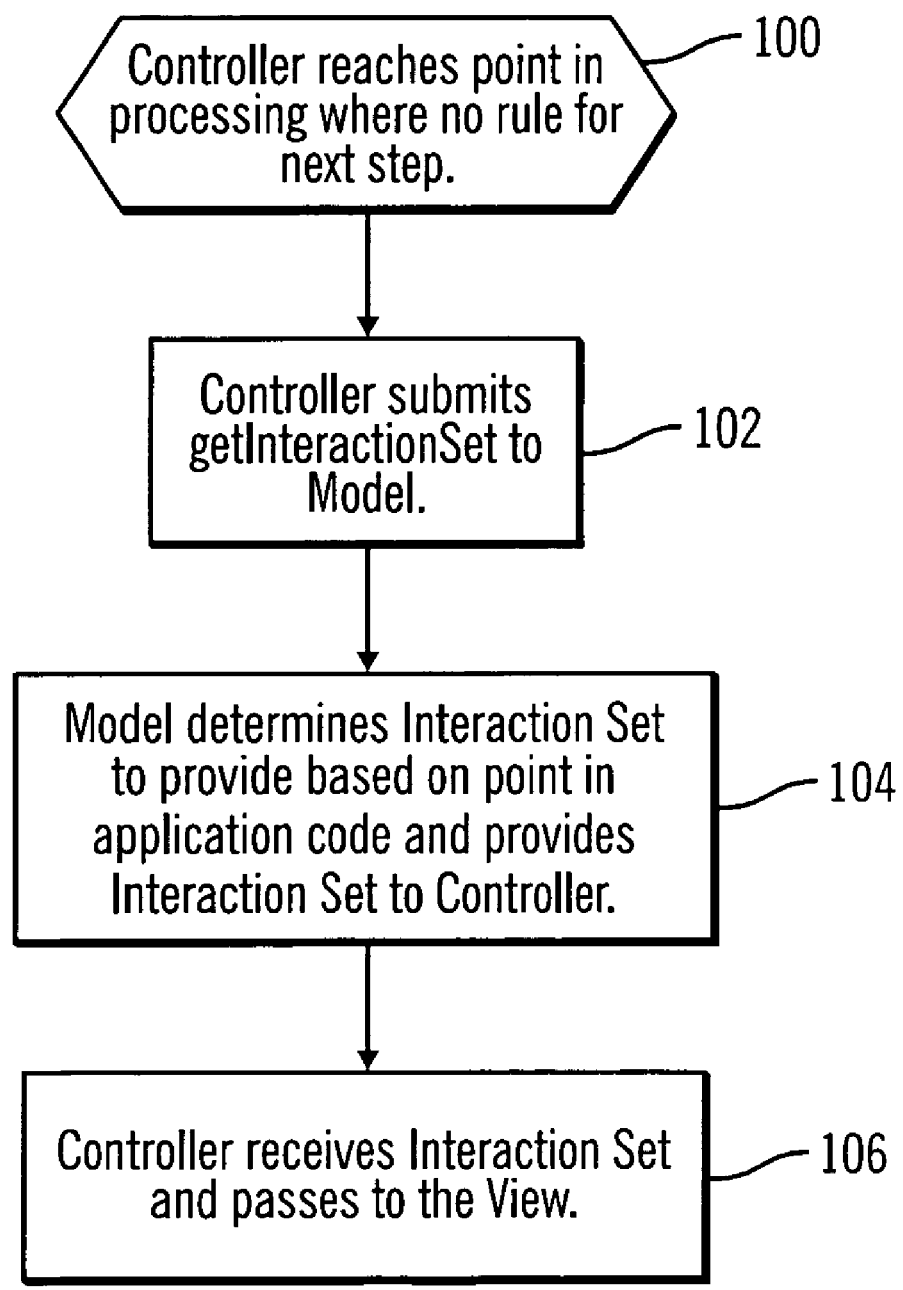
FIG. 5 illustrates logic implemented in the Model and Controller to provide interaction sets to the View in accordance with implementations of the invention.

FIG. 5 illustrates logic implemented in the Controller 26 and Model 22 to utilize the interaction sets 42a, b . . . n. At block 100, the Controller 26 reaches a point in processing where there is no specific rule or method to provide to the View 24. At such point, the Controller 26 submits (at block 102) a getInteractionset( ) method to the Model 22 requesting an interaction set 42a, b . . . n to provide to the View 24 to continue processing. In response, the Model 22 determines (at block 104) the interaction set 42a, b . . . n to provide based on its application code 40 and returns the determined interaction set 42a, b . . . n to the Controller 26. The application code 40 would provide specific interaction sets 42a, b . . . n to return based on the point in the processing at which the request for the interaction set from the Controller 26 is received. At block 106, the Controller 26 receives the returned interaction set 42a, b . . . n and passes the interaction set 42a, b . . . n to the View 24 to generate output for the output device 30.

Figure 6A:
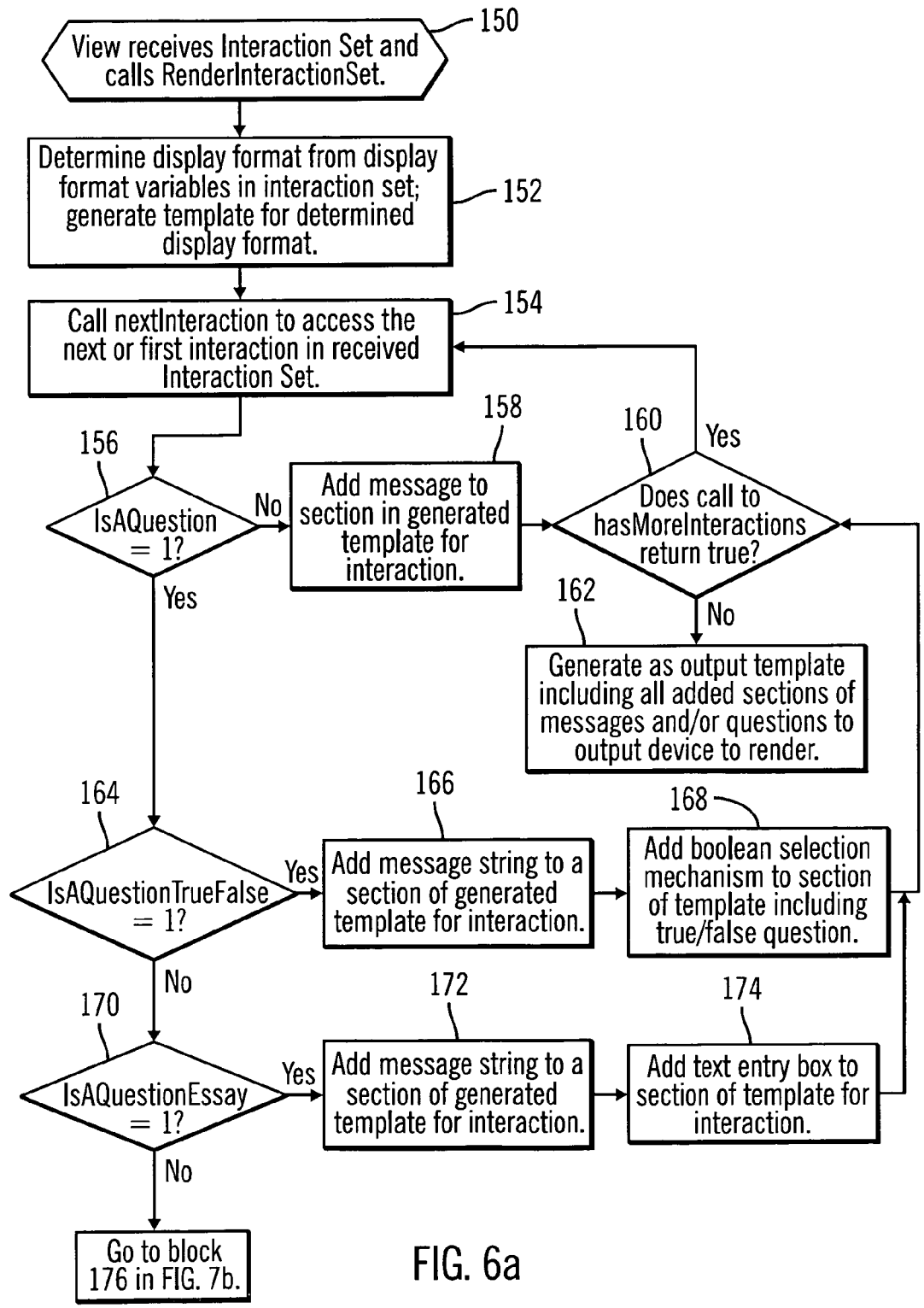
FIGS. 6a and 6b illustrate logic implemented in the View to generate output data from the interaction sets in accordance with implementations of the invention.
Figure 6B:
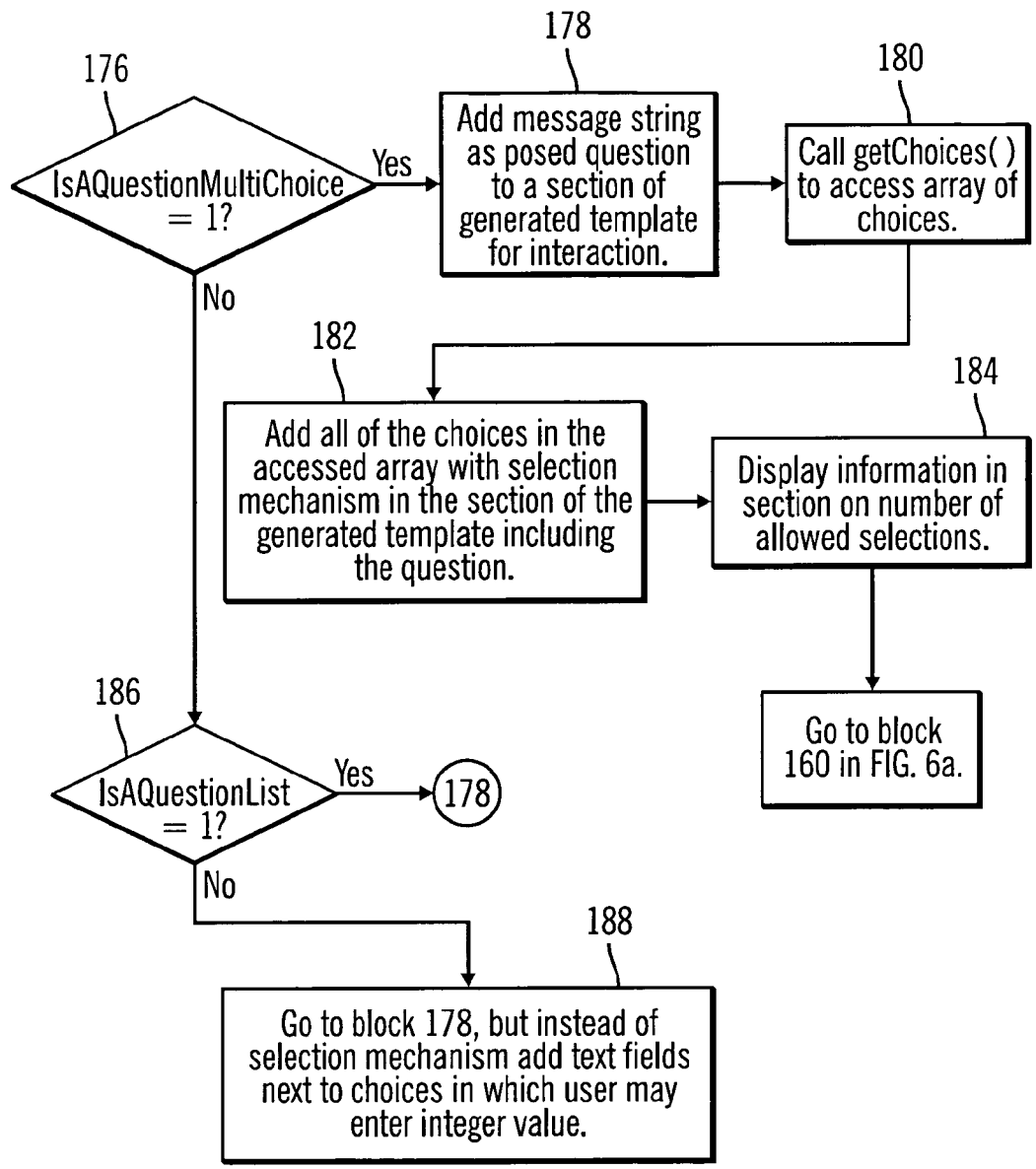

FIGS. 6a and 6b illustrate logic implemented in the View 24 to generate a windows style graphical user interface (GUI) that may present multiple messages and/or questions from one or more interactions 70a, b . . . n in the interaction set. 42a, b . . . n provided by the Controller 26. Control begins at block 150 with the View 24 calling the RenderInteractionSet method, with the received interaction set 42a, b . . . n as a parameter to generate output capable of being rendered by the output device 30. The View 24 determines (at block 152) the display format from the value in the interaction attribute 72 in the received interaction set 42a, b . . . n and generates a template for the messages and/or questions defined by the interactions. The generated template may provide graphical features and a layout that implements the display characterization indicated in the interface attribute 72. The View 24 then calls (at block 154) the nextInteraction( ) method to access the next or first interaction 70a, b . . . n upon accessing the first interaction. If (at block 156) the accessed interaction 70a, b . . . n is not a question, i.e., the response to the IsAQuestion( ) method returns false, then the View 24 adds (at block 158) the message string 74 in the interaction 70a, b . . . n to the section in the generated template used for the accessed interaction 70a, b . . . n. If (at block 160) a call by the View 24 to the hasMoreInteractions( ) method returns true, then control proceeds back to block 154 to process the next interaction 70a, b . . . n in the interaction set 42a, b . . . n. Otherwise, if there are no farther interactions 70a, b . . . n in the received interaction set 42a, b . . . n, then the View 24 generates as output the template including the messages and/or questions added from the interactions 70a, b . . . n. The output is provided to the output device 30 to render and present to the user.

If (at block 156) the interaction 70a, b . . . n provides a question and (at block 164) the question is a true/false type question, i.e., the call to the IsAQuestionTrueFalse( ) method returns true, then the View 24 adds (at block 166) the message string 74 to a section of the template for the interaction 70a, b . . . n as the question posed and adds (at block 168) a boolean selection mechanism, such as true and false radio buttons, to the template through which the user may select a true or false answer. Control then proceeds to block 160 to consider any further interactions 70a, b . . . n in the interaction set 42a, b . . . n.

If (at block 164) the interaction 70a, b . . . n is an essay type question, i.e., the call to the IsAQuestionEssay( ) method returns true, then the View 24 adds (at block 172) the message string 74 to a section of the template for the interaction 70a, b . . . n as the question posed and adds (at block 174) a text entry field to the template section for the interaction 70a, b . . . n in which the user may enter a string response to the question posed.

If (at block 176 in FIG. 6b) the interaction 70a, b . . . n is a multiple choice type question, i.e., the call to the IsAQuestionMultiChoice( ) method returns true, then the View 24 adds (at block 178) the message string 74 to a section of the template for the interaction 70a, b . . . n as the question posed and calls (at block 180) the getchoice( ) method to access the possible answer choices in the choice array 78. The list of possible choices from the choice array 78 are then added (at block 182) with a selection mechanism, such as a check box that can be selected with a check mark, to the section of the generated template for the multiple choice interaction 70a, b . . . n. Further, the View 24 then gets the allowedSelections variable and displays (at block 184) information in the template section on the total number of choices that may be selected for the question.

If (at block 186) the interaction 70a, b . . . n is a question list, i.e., the call to the IsAQuestionList( ) method returns true, then control proceeds to block 178 to generate the question and list choices into the template section for the interaction 70a, b . . . n. If the interaction 70a, b . . . n is not a question list, then, in certain implementations, the only possibility for the interaction 70a, b . . . n is a quantified question list. In such case, the question and choices are generated (at block 188) according to the logic at blocks 178 to 184, except that instead of displaying a selection mechanism, such as the check box, with each choice, a field is displayed next to each choice in which the user may enter an integer value. Information on any upper and lower limits for the integer values the user may enter may also be displayed with the displayed choices.

Figure 7:
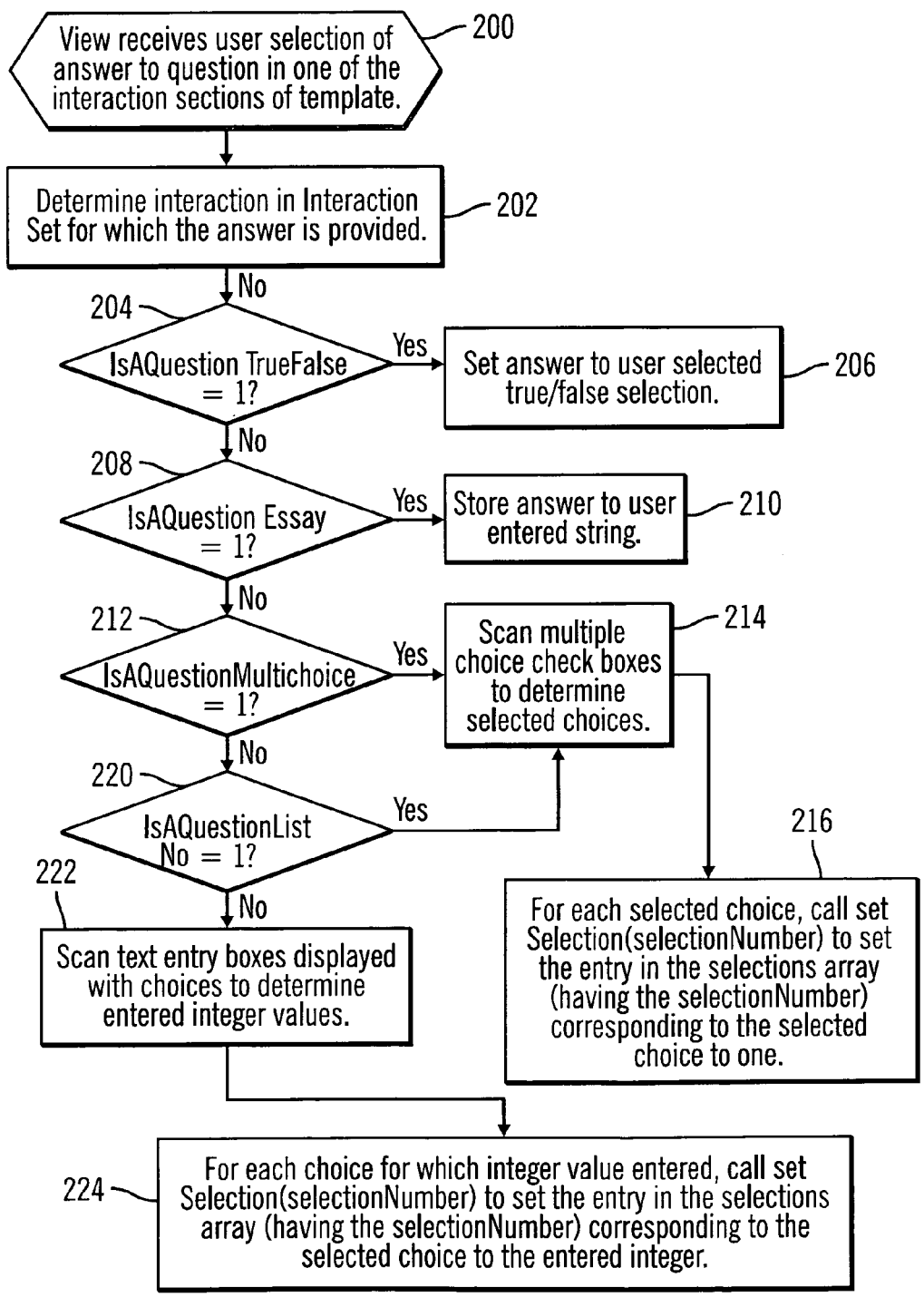
FIG. 7 illustrates logic implemented in the View to process user input in response to questions included in the rendered interaction set in accordance with implementations of the invention.

FIG. 7 illustrates logic implemented in the View 24 to populate the interactions 70a, b . . . n in the interaction set 42a, b . . . n with the answers selected or entered by the user in response to the posed questions. Control begins at block 200 with the View 24 receiving user selection of an answer to a question in one of the interaction sections of the template. The View 24 may begin the logic at block 200 after the user enters an answer for one interaction 70a, b . . . n or after the user provides answers to all the interaction 70a, b . . . n questions displayed in the template and selects a submit button displayed in the template. The View 24 determines (at block 202) the interaction 70a, b . . . n, in the Interaction set 42a, b . . . n for which the answer is provided. If (at block 204) the determined interaction 70a, b . . . n is a true/false question, then the View 24 sets (at block 206) the boolean answer 80 in the interaction 70a, b . . . n to the user selected true or false answer. If (at block 208) the determined interaction 70a, b . . . n is for an essay type question, then the View 24 sets (at block 210) the string answer 80 to the user entered string.

If (at block 212) the determined interaction 70a, b . . . n is a multiple choice type question, then the View 24 scans (at block 214) the multiple choice check boxes to determine those choices the user selected. For each selected choice, the View 24 then calls (at block 216) the setSelection(selectionNumber) method with the number of the selected choice in the list, which comprises a selection array, as a parameter to set the entry in the answer 80 for that selected choice to one. In this way, the selection array indicates each choice that the user selected from the displayed multiple choices. If (at block 220) the interaction 70a, b . . . n is a question list type question, then control proceeds to block 214 to generate the selection array answer 80. If an allowedSelections variable was provided with the question list and the user selected more than the allowed number of questions, then the View 24 may return a message to the user indicating that too many selections were made or perform some other exception handling operation.

If (at block 220) the interaction is not a question list, then, in certain described implementations, the only other possibility is a quantified question list. In such case, the View 24 would scan (at block 222) the text entry boxes displayed with the multiple choices to determine integer values entered for the choices. For each choice for which an integer value was entered, the View 24 would call (at block 224) the setSelection(selectionnumber) method with the number of the choices for which the user entered an integer value. This method sets the answer 80 selection array for the selected choice to the user entered integer. The View 24 may also perform some exception handling if the user enters an integer value for a choice that is outside of the range specified by the upperValidLimit and lowerValidLimit arrays.

Figure 8:
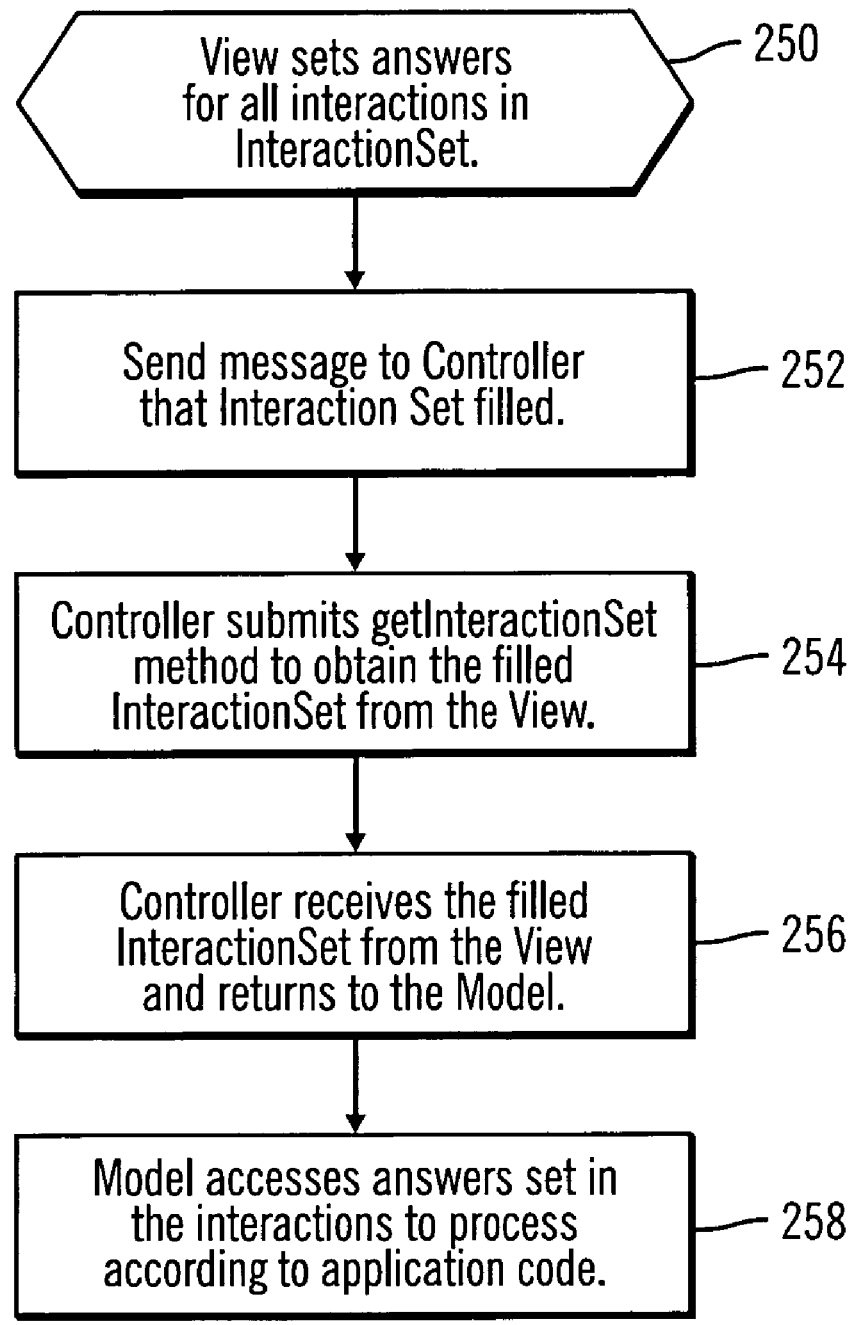
FIG. 8 illustrates logic implemented in the Model, View, and Controller to process an interaction set filled with received user input in accordance with implementations of the invention.

FIG. 8 illustrates logic implemented in the Model 22, View 24, and Controller 26 to handle an interaction set 42a, b . . . n filled with answers. After the View 24 has completed (at block 250) setting the answers 80 for all the interactions 70a, b . . . n in the interaction set 42a, b . . . n, the View 24 then sends (at block 252) a message to the Controller 26 that the interaction set 42a, b . . . n is filled. In response, the Controller 26 calls the getInteractionSeto method to obtain the filled interaction set 42a, b . . . n from the View 24 and passes (at block 256) the returned filled interaction set 42a, b . . . n to the Model 22. The Model 22 then accesses (at block 258) all the interaction answers 80 in the interaction set 42a, b . . . n and processes the accessed answers according to the application code 40.

The interface classes shown in FIGS. 3a, b allow developers to extend the Model View Controller (MVC) architecture to allow the Model 22 to submit questions to the View 24 based on the processing flow in the application code 40. Further, with the described implementations, the Model 22 may submit questions to the View 24 without interacting directly with the View 24. Because, with certain described implementations, the Model 22 and View 24 operate independently, the user interface remains separate from the application program. This means that Views that implement different types of user interfaces may utilize the same interaction sets to present data and gather input according to the type of View, without requiring the Model 22 to have any understanding of the View. For instance, the logic of FIGS. 6a, b and 7 described operations with respect to a View generating a windows-type GUI. However, a View implementing a command line interface, or any other user interface known in the art, could include logic to process the interaction sets and generate output particular to the user interface implemented by the View. A command line interface View may process an interaction 70a, b . . . n in the interaction set 42a, b . . . n, present the question to the viewer on the screen lines, and then receive the user input for a particular question on a displayed line before presenting the question in a next interaction 70a, b . . . n. Thus, with the described implementations, the View 24 maintains control over the presentation of data while the Model 22 operations data generate the data independently of the View 24.

ADDITIONAL IMPLEMENTATION DETAILS

The described implementations may be realized as a method, apparatus or article of manufacture using standard programming and/or engineering techniques to produce software, firmware, hardware, or any combination thereof The term"article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, different Views may generate questions and receive answers from the same interaction sets. The different Views may be used to render output on different types of output devices. For instance, one View may be used to render output for a windows-type operating system displaying data in windows-style GUIs, whereas another View may be used to render output on a command line interface, whereas still another View may be used to render data on an alternative type of output device, such as audio speakers and receive input through a microphone.

The above described interaction classes and sublcasses provide variables and methods for certain question types, e.g., true/false, essay, multiple choice, etc. Those skilled in the art will appreciate the subclasses that may be added to allow for the implementation of additional question types with different answer structures.

The above described implementations used the interaction set class and subclass to allow the Model 22 to communicate questions and messages to the View 24. Additionally, the interaction set class may be used to allow the Model 22 to communicate other types of information and data to the View 24.

In the described implementations, the answer data was added to the interactions in the interaction set that is returned to the Model. Alternatively, the answer data may be transmitted to the Model external to the interaction set that provided the questions for which the answers were provided.

In the logic of FIGS. 6a, b, all the questions and/or messages for all the interactions in one interaction set were displayed in a single window on a screen. Additionally, the interactions may be displayed across multiple screens or windows, displayed in a scrollable window where the scroller may be used to view additional questions and/or messages, or the output from the for interactions from multiple interaction sets may be displayed within a single screen or window.

The above implementations were described with respect to the Model View Controller (MVC) architecture. However, the interaction set method for allowing an application to communicate with a user interface module may apply to alternative computer program architectures for implementing user interfaces where the application functions remain separate from the user interface module that implements the user interface. For instance, the operations described with respect to the MVC Controller and View may be implemented in a single user interface module or dispersed across multiple program components. In such alternative implementations, different user interface modules may generate different types of user interfaces from the interaction sets to present the questions in the particular user interface implemented by the user interface module. Thus, the terms Model, View and Controller may also refer to any one or more components that perform the operations described with respect to the Model, View, and Controller components.

The interaction set classes and subclasses may be implemented in any object oriented computer programming languages known in the art, e.g., Java, C++, SmallTalk etc. Alternatively, the interaction set classes and application and user interface modules may be implemented in non-object oriented computer programming languages.

The above implementation described the interaction sets as comprised of interactions including particular type of objects and variables. Those skilled in the art will recognize that the interaction sets may be designed in different formats and to include different types of information to cause the Views to display messages, questions and/or other data.

FIGS. 5, 6a, b, 7, and 8 described specific operations occurring in a particular order. In alternative implementations, certain of the logic operations may be performed in a different order, modified or removed and still perform in accordance with implementations of the present invention. Moreover, steps may be added to the above described logic and still conform to implementations of the invention. Further, operations described herein may occur sequentially or certain operations may be processed in parallel.

The foregoing description of various implementation of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

JAVA is a trademark of Sun Microsystems, Inc.

What is claimed is:

1. A method for generating a user interface, wherein an application program processes data and generates application output and wherein a user interface module processes the application output to generate output data to render on an output device, comprising:
   generating output data, with the user interface module, to render on the output device in response to processing statements in the user interface module;
   reaching a processing point, with the user interface module, where the user interface module does not include statements to generate output data;
   receiving, with the user interface module, an interaction object generated by the application program specifying data after reaching the processing point; and
   generating output data to render on the output device from the interaction object.

2. The method of claim 1, wherein the interaction object further includes attribute information indicating characteristics of the data to output, wherein the output data is rendered in a format corresponding to the characteristics indicated in the attribute information.

3. The method of claim 1, wherein the user interface module comprises a Controller and View and the application program comprises a Model conforming to the Model View Controller architecture.

4. The method of claim 3, wherein the Controller includes the statements that are processed to generate output data, further comprising:
   requesting, with the Controller, the interaction object from the Model upon reaching the processing point; and
   transferring, with the Controller, the received interaction object to the View, wherein the View generates the output data to render from the interaction object.

5. The method of claim 4, wherein the output data generated by the Model includes questions, further comprising:
   receiving, with the View, user input in response to the presented questions;
   adding, with the View, the received user input to the interaction object including the output data generated by the View; and
   returning the interaction object including the received user input to the Model to process.

6. The method of claim 5, wherein returning the interaction object including the received user input to the Model further comprises:
   transmitting, with the View, the interaction object including the answers to the Controller; and
   transferring, with the Controller, the Interaction Object including the received user input to the Model.

7. The method of claim 1, wherein multiple user interface modules are capable of generating output data from the interaction object, wherein each user interface module generates the output data to render in a different format.

8. The method of claim 7, wherein each user interface module generates the output data to render on a different type of output device.

9. The method of claim 1, further comprising:
   continuing to generate, with the user interface module, output data in response to processing statements in the user interface module after the output data generated from the interaction object is rendered on the output device.

10. A method for generating a user interface, wherein an application program processes data and generates application output and wherein a user interface module processes the application output to generate output data to render on an output device by:
   generating, by the user interface module, output data to render on the output device in response to processing statements in the user interface module;
   receiving, by the user interface module, an interaction object generated by the application program specifying data to generate as output data;
   generating, by the user interface module, output data to render on the output device from the interaction object from the data specified in the interaction object;
   receiving, by the user interface module, user input in response to the output data rendered on the output device from the interaction object;

modifying, by the user interface module, the interaction object to include the received user input; and returning, by the user interface module, the interaction object including the received user input to the application program.

11. The method of claim 10, wherein the interaction object further specifies attribute information, wherein the output data is rendered on the output device in a format that corresponds to the specified attribute information.

12. The method of claim 10, wherein the interaction object comprises a plurality of interactions, wherein each interaction includes data to cause the user interface module to render a message or question on the output device.

13. The method of claim 12, wherein each interaction is capable of providing information to cause the user interface module to generate a question that is a member of a set of questions comprising:

a true false question;

an essay question; and a multiple choice question.

14. The method of claim 12, wherein one or more interactions may include data to render a multiple choice question by providing:

a question string comprising a question presented to the user;

a choice array comprising a plurality of user selectable choices to present as responses to the presented question, wherein the choices in the choice array are presented on the output device with a selection mechanism to enable selection of at least one of the choices; and a selection array indicating which user selectable choices were selected through the selection mechanism, wherein the selection array comprises the received user input in response to the presented question.

15. The method of claim 14, wherein the interaction including data to render a multiple choice question further includes:

an allowable selection variable indicating a maximum number of user selectable choices that may be indicated as selected in the selection array.

16. The method of claim 10, wherein the user interface module comprises a Controller and View components and the application program comprises a Model conforming to the Model View Controller architecture.

17. The method of claim 10, wherein multiple user interface modules are capable of generating output data from the interaction object, wherein each user interface module generates the output data to render in a different format.

18. The method of claim 17, wherein each user interface module generates the output data from the interaction object to render on a different type of output device.

19. A system for generating a user interface on an output device, comprising:

a computer readable medium;

an application program means for processing data and generating application output;

an interaction object included in the computer readable medium specifying data to generate, wherein the application program means generates the interaction object; and a user interface module means for generating output data to render on the output device by performing:

(i) processing statements in the user interface module to generate output data to render on the output device;

(ii) reaching a processing point where the user interface module does not include statements to generate output data;

(iii) receiving an interaction object from the application program specifying data after reaching the processing point; and (iv) generating output data to render on the output device from the interaction object.

20. The system of claim 19, wherein the interaction object further includes attribute information indicating characteristics of the data to output, wherein the user interface module means renders the output data in a format corresponding to the characteristics indicated in the attribute information.

21. The system of claim 19, wherein the user interface module means includes a Controller means and View means and the application program comprises a Model means conforming to the Model View Controller architecture.

22. The system of claim 21, wherein the Controller means includes the statements that are processed to generate output data, wherein the Controller means further performs:

requesting the interaction object from the Model upon reaching the processing point; and transferring the received interaction object to the View, wherein the View generates the output data to render from the interaction object.

23. The system of claim 22, wherein the output data generated by the Model means includes questions, wherein the View means further performs:

receiving user input in response to the presented questions;

adding the received user input to the interaction object including the output data generated by the View; and returning the interaction object including the received user input to the Model to process.

24. The system of claim 23, wherein returning the interaction object including the received user input to the Model is performed by:

transmitting, with the View means, the interaction object including the answers to the Controller; and transferring, with the Controller means, the Interaction Object including the received user input to the Model.

25. The system of claim 19, further comprising: multiple user interface module means capable of generating output data from the interaction object, wherein each user interface module means generates the output data to render in a different format.

26. The system of claim 25, wherein each user interface module generates the output data to render on a different type of output device.

27. The system of claim 19, wherein the user interface module means further performs:

continuing to generate, with the user interface module, output data in response to processing statements in the user interface module after the output data generated from the interaction object is rendered on the output device.

28. A system for generating a user interface on an output device, comprising:

a computer readable medium;

an application program means for processing data and generating application output;

an interaction object included in the computer readable medium specifying data to generate, wherein the application program means generates the interaction object; and a user interface module means for generating output data to render on the output device by performing:

(i) receiving the interaction object specifying data to generate as output data;

(ii) generating output data to render on the output device from the interaction object from the data specified in the interaction object;

(iii) receiving user input in response to the output data rendered on the output device from the interaction object;

(iv) modifying the interaction object to include the received user input; and (v) returning the interaction object to including the received user input to the application program.

29. The system of claim 28, wherein the interaction object further specifies attribute information, wherein the output data is rendered on the output device in a format that corresponds to the specified attribute information.

30. The system of claim 28, wherein the interaction object comprises a plurality of interactions, wherein each interaction includes data to cause the user interface module means to render a message or question on the output device.

31. The system of claim 30, wherein each interaction is capable of providing information to cause the user interface module means to generate a question that is a member of a set of questions comprising:
 a true false question;
 an essay question; and
 a multiple choice question.

32. The system of claim 30, wherein one or more interactions may include data to cause the user interface module means to render a multiple choice question by providing:
 a question string comprising a question presented to the user;
 a choice array comprising a plurality of user selectable choices to present as responses to the presented question, wherein the choices in the choice array are presented on the output device with a selection mechanism to enable selection of at least one of the choices; and
 a selection array indicating which user selectable choices were selected through the selection mechanism, wherein the selection array comprises the received user input in response to the presented question.

33. The system of claim 32, wherein the interaction including data to render a multiple choice question further includes:
 an allowable selection variable indicating a maximum number of user selectable choices that may be indicated as selected in the selection array.

34. The system of claim 28, wherein the user interface module means comprises a Controller and View components and the application program means comprises a Model conforming to the Model View Controller architecture.

35. The system of claim 28, wherein multiple user interface module means are capable of generating output data from the interaction object, wherein each user interface module means generates the output data to render in a different format.

36. The system of claim 35, wherein each user interface module generates the output data from the interaction object to render on a different type of output device.

37. An article of manufacture including code for generating a user interface, wherein the code includes an application program that processes data and generates application output and a user interface module that processes the application output to generate output data to render on an output device by:
 generating output data to render on the output device in response to processing statements in the user interface module;

reaching a processing point where the user interface module does not include statements to generate output data;

receiving an interaction object generated by the application program specifying data after reaching the processing point; and generating output data to render on the output device from the interaction object.

38. The article of manufacture of claim 37, wherein the interaction object further includes attribute information indicating characteristics of the data to output, wherein the output data is rendered in a format corresponding to the characteristics indicated in the attribute information.

39. The article of manufacture of claim 37, wherein the user interface module comprises a Controller and View and the application program comprises a Model conforming to the Model View Controller architecture.

40. The article of manufacture of claim 39, wherein the Controller includes the statements that are processed to generate output data, and wherein the Controller further performs:
 requesting ,the interaction object from the Model upon reaching the processing point; and
 transferring the received interaction object to the View, wherein the View generates the output data to render from the interaction object.

41. The article of manufacture of claim 40, wherein the output data generated by the model includes questions, further comprising:
 receiving, with the View, user input in response to the presented questions;
 adding, with the View, the received user input to the interaction object including the output data generated by the View; and
 returning the interaction object including the received user input to the Model to process.

42. The article of manufacture of claim 41, wherein returning the interaction object including the received user input to the Model further comprises:
 transmitting, with the View, the interaction object including the answers to the Controller; and
 transferring, with the Controller, the Interaction Object including the received user input to the Model.

43. The article of manufacture of claim 37, wherein multiple user interface modules are capable of generating output data from the interaction object, wherein each user interface module generates the output data to render in a different format.

44. The article of manufacture of claim 37, wherein each user interface module generates the output data to render on a different type of output device.

45. The article of manufacture of claim 37, further comprising:
 continuing to generate, with the user interface module, output data in response to processing statements in the user interface module after the output data generated from the interaction object is rendered on the output device.

46. An article of manufacture including code for generating a user interface, wherein the code includes an application program that processes data and generates application output and a user interface module that processes the application output to generate output data to render on an output device by:
 generating, by the user interface module, output data to render on the output device in response to processing statements in the user interface module;

receiving, by the user interface module, an interaction object from the application program specifying data to generate as output data;

generating, by the user interface module, output data to render on the output device from the interaction object from the data specified in the interaction object;

receiving, by the user interface module, user input in response to the output data rendered on the output device from the interaction object;

modifying, by the user interface module, the interaction object to include the received user input; and returning, by the user interface module the interaction object including the received user input to the application program.

47. The article of manufacture of claim 46, wherein the interaction object further specifies attribute information, wherein the output data is rendered on the output device in a format that corresponds to the specified attribute information.

48. The article of manufacture of claim 46, wherein the interaction object comprises a plurality of interactions, wherein each interaction includes data to cause the user interface module to render a message or question on the output device.

49. The article of manufacture of claim 48, wherein each interaction is capable of providing information to cause the user interface module to generate a question that is a member of a set of questions comprising:

a true false question;

an essay question; and a multiple choice question.

50. The article of manufacture of claim 48, wherein one or more interactions may include data to cause the user interface module to render a multiple choice question by providing:

a question string comprising a question presented to the user;

a choice array comprising a plurality of user selectable choices to present as responses to the presented question, wherein the choices in the choice array are presented on the output device with a selection mechanism to enable selection of at least one of the choices; and a selection array indicating which user selectable choices were selected through the selection mechanism, wherein the selection array comprises the received user input in response to the presented question.

51. The article of manufacture of claim 46, wherein the interaction including data to cause the user interface module to render a multiple choice question further includes:

an allowable selection variable indicating a maximum number of user selectable choices that may be indicated as selected in the selection array.

52. The article of manufacture of claim 46, wherein the user interface module comprises a Controller and View components and the application program comprises a Model conforming to the Model View Controller architecture.

53. The article of manufacture of claim 46, wherein multiple user interface modules are capable of generating output data from the interaction object, wherein each user interface module generates the output data to render in a different format.

54. The article of manufacture of claim 53, wherein each user interface module generates the output data from the interaction object to render on a different type of output device.

* * * * *